United States Patent
Maeda et al.

(10) Patent No.: US 11,136,641 B2
(45) Date of Patent: Oct. 5, 2021

(54) MN-CONTAINING GALVANNEALED STEEL SHEET AND METHOD FOR PRODUCING THE SAME

(71) Applicant: JFE Steel Corporation, Tokyo (JP)

(72) Inventors: Satoshi Maeda, Tokyo (JP); Yoichi Makimizu, Tokyo (JP); Yoshitsugu Suzuki, Tokyo (JP); Katsumi Yamada, Tokyo (JP); Yoshiyasu Kawasaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 522 days.

(21) Appl. No.: 16/064,526

(22) PCT Filed: Dec. 8, 2016

(86) PCT No.: PCT/JP2016/005079
§ 371 (c)(1),
(2) Date: Jun. 21, 2018

(87) PCT Pub. No.: WO2017/110054
PCT Pub. Date: Jun. 29, 2017

(65) Prior Publication Data
US 2019/0003006 A1    Jan. 3, 2019

(30) Foreign Application Priority Data
Dec. 22, 2015 (JP) ............................... JP2015-250124

(51) Int. Cl.
| | |
|---|---|
| *C21D 9/46* | (2006.01) |
| *C23C 2/06* | (2006.01) |
| *C23C 2/28* | (2006.01) |
| *C23C 2/40* | (2006.01) |
| *C22C 38/06* | (2006.01) |
| *C21D 8/02* | (2006.01) |
| *C22C 38/02* | (2006.01) |
| *C22C 38/04* | (2006.01) |
| *C22C 38/00* | (2006.01) |
| *B32B 15/01* | (2006.01) |
| *B32B 15/18* | (2006.01) |
| *C21D 6/00* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/18* | (2006.01) |
| *C22C 38/60* | (2006.01) |
| *C23C 2/02* | (2006.01) |

(52) U.S. Cl.
CPC .............. *C21D 9/46* (2013.01); *B32B 15/013* (2013.01); *B32B 15/18* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0278* (2013.01); *C22C 38/00* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/60* (2013.01); *C23C 2/02* (2013.01); *C23C 2/06* (2013.01); *C23C 2/28* (2013.01); *C23C 2/40* (2013.01); *C21D 2211/001* (2013.01)

(58) Field of Classification Search
None
See application file for complete search history.

(56) References Cited

U.S. PATENT DOCUMENTS

| | | | | |
|---|---|---|---|---|
| 6,087,019 | A * | 7/2000 | Isobe .................. | C21D 8/0278 428/469 |
| 2008/0083477 | A1* | 4/2008 | Drillet ................ | C23C 2/02 148/242 |
| 2010/0186854 | A1* | 7/2010 | Bertrand ............. | C23C 2/06 148/276 |
| 2012/0125491 | A1* | 5/2012 | Meurer ............... | C23C 2/02 148/533 |

(Continued)

FOREIGN PATENT DOCUMENTS

| | | |
|---|---|---|
| CN | 104245999 A | 12/2014 |
| CN | 104364410 A | 2/2015 |

(Continued)

OTHER PUBLICATIONS

JP2010-196083 machine translation (Year: 2010).*

(Continued)

*Primary Examiner* — Paul A Wartalowicz
*Assistant Examiner* — Stephani Hill
(74) *Attorney, Agent, or Firm* — RatnerPrestia

(57) ABSTRACT

High-strength galvannealed steel sheet including any of a) an oxide containing Fe and Mn, b) an oxide containing Fe and Mn and an Fe oxide, c) an oxide containing Fe and Mn and a Mn oxide, d) an oxide containing Fe and Mn, an Fe oxide, and a Mn oxide, and e) an Fe oxide and a Mn oxide is present in a zinc coated layer. The total amount of oxide is 0.01 to 0.100 g/m$^2$; the ratio by mass % of Mn to Fe, e.g., Mn/Fe, contained in the oxide is 0.10 to 10.00; an oxide of at least one selected from Fe and Mn is present in an amount of 60% or more; and an oxide of at least one selected from Fe and Mn is present in a surface layer portion of a steel sheet in an amount of 0.040 g/m$^2$ or less (not including zero).

18 Claims, No Drawings

(56) References Cited

U.S. PATENT DOCUMENTS

| | | | |
|---|---|---|---|
| 2013/0280551 A1* | 10/2013 | Kariya | ............... C21D 8/0436 428/640 |
| 2014/0220382 A1 | 8/2014 | Makimizu et al. | |
| 2014/0234656 A1 | 8/2014 | Fujita et al. | |
| 2015/0017474 A1 | 1/2015 | Harako et al. | |
| 2015/0044503 A1 | 2/2015 | Fushiwaki et al. | |
| 2016/0067947 A1 | 3/2016 | Minowa et al. | |
| 2017/0088914 A1 | 3/2017 | Ikeda et al. | |

FOREIGN PATENT DOCUMENTS

| | | | | |
|---|---|---|---|---|
| CN | 104870679 | A | | 8/2015 |
| EP | 2762600 | A1 | | 8/2014 |
| EP | 2829626 | A1 | | 1/2015 |
| EP | 2937436 | A1 | | 10/2015 |
| JP | 2005023348 | A | | 1/2005 |
| JP | 4464720 | B2 | | 5/2010 |
| JP | 2010196083 | A | * | 9/2010 |
| JP | 2011058013 | A | | 3/2011 |
| JP | 2011117063 | A | * | 6/2011 |
| JP | 4718782 | B2 | | 7/2011 |
| JP | 2013014834 | A | | 1/2013 |
| JP | 2013194270 | A | | 9/2013 |
| JP | 2013256714 | A | | 12/2013 |
| JP | 2014015676 | A | | 1/2014 |
| JP | 2015193907 | A | | 11/2015 |
| KR | 20120056588 | A | | 6/2012 |
| KR | 20140068122 | A | | 6/2014 |
| WO | 2013047804 | A1 | | 4/2013 |
| WO | 2013128867 | A1 | | 9/2013 |
| WO | 2014175256 | A1 | | 10/2014 |

OTHER PUBLICATIONS

JP2011-117063 machine translation (Year: 2011).*

Chinese Office Action for Chinese Application No. 201680075276.3, dated Sep. 26, 2019, with Concise Statement of Relevance of Office Action, 7 pages.

Korean Office Action for Korean Application No. 10-2018-7017602, dated Dec. 5, 2019 with Concise Statement of Relevance of Office Action, 5 pages.

International Search Report and Written Opinion for International Application No. PCT/JP2016/005079, dated Jan. 10, 2017—5 pages.

Extended European Search Report for European Application No. 16 877 959.3, dated Aug. 14, 2018, 6 pages.

* cited by examiner

MN-CONTAINING GALVANNEALED STEEL SHEET AND METHOD FOR PRODUCING THE SAME

CROSS REFERENCE TO RELATED APPLICATIONS

This is the U.S. National Phase application of PCT/JP2016/005079, filed Dec. 8, 2016, which claims priority to Japanese Patent Application No. 2015-250124, filed Dec. 22, 2015, the disclosures of these applications being incorporated herein by reference in their entireties for all purposes.

TECHNICAL FIELD OF THE INVENTION

The present invention relates to a Mn-containing galvannealed steel sheet particularly having good bendability and a beautiful surface appearance free from bare spots, and a method for producing the Mn-containing galvannealed steel sheet.

BACKGROUND OF THE INVENTION

Surface-treated steel sheets obtained by imparting corrosion resistance to base steel sheets, in particular, galvannealed steel sheets having good corrosion resistance, have recently been used in fields such as automobiles, household appliances, and construction materials. From the viewpoint of improving the fuel economy and the crashworthiness of automobiles, in order to produce lighter, higher-strength automobile bodies by the use of automobile body materials having a smaller thickness which is brought by increasing the strength thereof, the use of high-strength galvannealed steel sheets for automobiles has been promoted.

A galvannealed steel sheet is commonly produced by a method as follows: A steel sheet obtained by subjecting a slab to hot rolling or cold rolling and then to heat treatment is used as a base material. Surfaces of the base material steel sheet are degreased and/or washed by pickling in a pretreatment step. Alternatively, oil on the surfaces of the base material steel sheet is burned away by firing in a preheating furnace without performing the pretreatment step. Then recrystallization annealing is performed by heating in a non-oxidizing atmosphere or a reducing atmosphere. The base material steel sheet is cooled to a temperature appropriate for coating treatment in the non-oxidizing atmosphere or the reducing atmosphere and then subjected to hot-dip galvanizing treatment by immersing the base material steel sheet in a zinc bath. Subsequently, alloying treatment is performed.

Here, in order to strengthen the steel sheet, a solid-solution strengthening element such as Si, Mn, or Al is added. Of these, Mn is effective in stabilizing an austenite phase and increasing the amount of the austenite phase. A retained austenite phase ultimately obtained has transformation induced plasticity and thus has significantly improved elongation.

However, in the case where a galvannealed steel sheet is produced from a high-Mn-content, high-strength steel sheet as a base material, the following problem arises: As described above, after the base steel sheet is subjected to annealing by heating in a non-oxidizing atmosphere or a reducing atmosphere, hot-dip galvanizing treatment is performed. However, Mn in the steel is an easily oxidizable element and thus reacts with oxygen and water vapor in an annealing furnace to form an oxide on surfaces of the steel sheet. The oxide decreases the wettability of the steel sheet with a hot-dip galvanizing bath (wettability of molten zinc with the underlying steel sheet) to form bare spots. Thus, the appearance of the coated surface is degraded as the Mn content of the steel is increased.

To address the foregoing problem, Patent Literature 1 or 2 discloses a technique for improving the appearance of a coating by specifying the water-vapor concentration in an annealing furnace, increasing the dew point, and thereby oxidizing Mn in the underlying steel sheet to inhibit external oxidation. However, because a large amount of internal oxide is formed in the surfaces of the steel sheet, the oxide serves as a starting point of cracking, thus degrading the bendability of the coated steel sheet.

Patent Literature 3 discloses a technique for improving the appearance of a coating surface by setting the maximum temperature of a steel sheet to 600° C. to 700° C. or lower in an annealing furnace, setting the passage time of the steel sheet to 30 seconds to 10 minutes in the steel sheet temperature range of 600° C. to 700° C. or lower, and setting the dew point of an atmosphere to −45° C. or lower. However, it is difficult to control the dew point in the annealing furnace to −45° C. or lower. To realize the technique, new facilities need to be installed, leading to an increase in cost.

Patent Literature 4 discloses a technique for improving the appearance of a coating surface by attaching an Fe-based oxide on surfaces of a steel sheet before annealing and then setting the maximum temperature of the steel sheet to 600° C. to 750° C. in an annealing furnace. However, also in this method, a large amount of internal oxide is formed in the surfaces of the steel sheet, degrading the bendability of the coated steel sheet. Furthermore, because of a low annealing temperature, an Fe oxide film is partially left and an uneven appearance caused by alloying is concerned.

Patent Literature

PTL 1: Japanese Patent No. 4464720
PTL 2: Japanese Patent No. 4718782
PTL 3: Japanese Unexamined Patent Application Publication No. 2013-194270
PTL 4: Japanese Unexamined Patent Application Publication No. 2014-15676

SUMMARY OF THE INVENTION

The present invention has been accomplished in light of the foregoing circumstances and aims to provide a Mn-containing galvannealed steel sheet obtained by the use of a high-Mn-content steel sheet as a base material, the Mn-containing galvannealed steel sheet having a good surface appearance and good bendability, and a method for producing the Mn-containing galvannealed steel sheet. Specifically, aspects of the present invention aim to provide a Mn-containing galvannealed steel sheet in which the surface selective oxidation of Mn is controlled to eliminate uneven alloying, the Mn-containing galvannealed steel sheet having good bendability, and a method for producing the Mn-containing galvannealed steel sheet.

The inventors have conducted studies on a Mn-containing galvannealed steel sheet to solve the problem and a method for producing the Mn-containing galvannealed steel sheet and have found that the bendability is improved under the following conditions: An internal oxide is not dispersed on a surface of the interface, the surface being adjacent to the steel sheet, between a steel sheet (base steel sheet) and a coated layer, but the oxide is dispersed in the coated layer.

The cross-sectional area fraction of the oxide present in a range from a surface of the coated layer to a position 50% or less of the total thickness of the coated layer is 60% or more with respect to the oxide in the coated layer. The Mn/Fe ratio of the oxide, in the coated layer is controlled. The reason for this is presumably as follows: The internal oxide on the surface of the interface, the surface being adjacent to the steel sheet, between the steel sheet (base steel sheet) and the coated layer are reduced to reduce the starting points of cracking. The oxide dispersed in the vicinity of the surface of the coated layer is exposed at the surface during processing and acts as a lubricant to reduce the coefficient of friction, thus reducing resistance to bending. It has also been found that a higher Mn/Fe ratio of the oxide in the coated layer results in further improved bendability. The reason for this is presumably that a Mn oxide has a higher melting point than an Fe oxide and does not easily adhere during processing to reduce the coefficient of friction.

It has also been found that heating a steel sheet at a temperature of 60° C. to 250° C. in an atmosphere containing $O_2$ and $H_2O$ concentrations controlled is effective in inhibiting uneven alloying before oxidation in a direct fired furnace (hereinafter, also referred to as a "DFF"). The inventors have conducted studies on the cause of the occurrence of uneven alloying and have found that when a Mn/Fe composite oxide formed in the DFF is reduced in an annealing furnace, the reduction of an Fe oxide in the vicinity of a Mn oxide is inhibited to cause uneven reduction, leading to an uneven alloying reaction. Thus, in an embodiment of the invention, in order to inhibit the uneven alloying, the oxide formed in the DFF is required to be an Fe oxide. The inventors have found that, before heating with the DFF, heating a steel sheet at a temperature of 60° C. to 250° C. in an atmosphere containing $O_2$ and $H_2O$ concentrations controlled allows Mn to be uniformly subjected to selective oxidation on surfaces of the steel sheet, so that the oxide formed in the DFF is converted from the Fe/Mn composite oxide into an Fe oxide.

Consequently, in order to produce a galvannealed steel sheet having good bendability and good surface appearance, a method in accordance with an embodiment of the invention is found to be effective, the method including heating a steel sheet with a continuous hot-dip galvanizing line before the DFF under the foregoing conditions to allow Mn to be uniformly subjected to selective oxidation on the surfaces of the steel sheet, thus converting an oxide formed in the DFF from the Fe/Mn composite oxide into an Fe oxide; limiting the distribution of an internal oxide present on the surfaces of the steel sheet after annealing to only the vicinity of each surface of the steel sheet by controlling the air ratio and the temperature in the DFF and controlling the atmosphere, the temperature, and so forth during annealing; and dispersing the internal oxide in the coated layer by an alloying reaction to eliminate the internal oxide from the surface of the interface, the surface being adjacent to the steel sheet, between the steel sheet (base steel sheet) and the coated layer, i.e., the surface of the base steel sheet.

The present invention is based on the aforementioned findings and has features as listed below.

[1] An embodiment of a Mn-containing galvannealed steel sheet includes a steel sheet containing, on a mass % basis, C: 0.03% to 0.35%, Si: 0.01% to 2.00%, Mn: 3.0% to 8.0%, Al: 0.001% to 1.000%, P: 0.10% or less, and S: 0.01% or less, the balance being Fe and incidental impurities, the steel sheet having a zinc coated layer on one or both surfaces thereof with a coating weight of 20 to 120 g/m², in which the zinc coated layer contains any one of a) to e) described below, a) an oxide containing Fe and Mn, b) an oxide containing Fe and Mn and an Fe oxide, c) an oxide containing Fe and Mn and a Mn oxide, d) an oxide containing Fe and Mn, an Fe oxide, and a Mn oxide, and e) an Fe oxide and a Mn oxide, a total amount of the oxide is 0.01 to 0.100 g/m² in terms of the amount of O, the ratio by mass % of Mn to Fe, i.e., Mn/Fe, contained in the oxide is 0.10 to 10.00, the oxide of at least one selected from Fe and Mn is present in an amount of 60% or more in terms of a cross-sectional area fraction in a range from a surface of the zinc coated layer to a position 50% or less of the total thickness of the zinc coated layer, and an oxide of at least one selected from Fe and Mn is present in a surface layer portion of the steel sheet in an amount of 0.040 g/m² or less (not including zero) in terms of the amount of O, the surface layer portion of the steel sheet extending from a surface of the steel sheet underlying directly below the zinc coated layer to a position 5 μm or less from the surface thereof.

[2] The Mn-containing galvannealed steel sheet described in [1] includes the steel sheet further containing, on a mass % basis, one or more elements selected from B: 0.001% to 0.005%, Nb: 0.005% to 0.050%, Ti: 0.005% to 0.080%, Cr: 0.001% to 1.000%, Mo: 0.05% to 1.00%, Cu: 0.05% to 1.00%, Ni: 0.05% to 1.00%, and Sb: 0.001% to 0.200%, in a component composition.

[3] A method for producing the Mn-containing galvannealed steel sheet described in [1] or [2] includes, in the case of subjecting a steel sheet to coating treatment in a continuous hot-dip galvanizing line, a heating step A of heating the steel sheet at 60° C. to 250° C. and holding the steel sheet at a steel sheet temperature of 60° C. to 250° C. for 10 to 60 seconds in an atmosphere having an $O_2$ concentration of 1.0% to 5.0% by volume and a $H_2O$ concentration of 10% to 30% by volume, the balance being at least one selected from $N_2$, $CO_2$, CO, and $H_2$ and incidental impurities, a heating step B of heating the steel sheet at 550° C. to 700° C. and holding the steel sheet at a steel sheet temperature of 550° C. to 700° C. for 30 seconds or less in a direct fired furnace (DEF) with a combustion gas having an air ratio of 1.00 to 1.20, and a heating step C of holding the steel sheet at 550° C. to 700° C. for 10 to 300 seconds in a reducing atmosphere having a $H_2$ concentration of 1% to 50% by volume, the balance being one or more selected from $H_2O$, $N_2$, CO, and $CO_2$ and incidental impurities, in which the heating step A, the heating step B, and the heating step C are successively performed, and then hot-dip galvanizing treatment is performed.

[4] In the heating step B of the method for producing the Mn-containing galvannealed steel sheet described in [3], substep of heating the steel sheet with a combustion gas having an air ratio of 1.00 to 1.20 and a substep of heating the steel sheet with a combustion gas having an air ratio of 0.80 to 1.00 are successively performed to heat the steel sheet at a temperature of 550° C. to 700° C.

[5] In the heating step C of the method for producing the Mn-containing galvannealed steel sheet described in [3] or [4], the atmosphere has a dew point of −60° C. to −20° C.

[6] In the method for producing the Mn-containing galvannealed steel sheet described in any of [3] to [5], after the hot-dip galvanizing treatment is performed, alloying treatment that heats the resultant steel sheet to higher than 460° C. to lower than 570° C. is performed.

The Mn-containing galvannealed steel sheet in accordance with an embodiment of the present invention includes both of the case of using a cold-rolled steel sheet as a base material and the case of using a hot-rolled steel sheet as a base material. The expression "good surface appearance" indicates an appearance free from a bare spot or uneven alloying.

According to an embodiment of the present invention, the Mn-containing galvannealed steel sheet having a good surface appearance and good bendability can be provided. According to the production method of an embodiment of the present invention, the Mn-containing galvannealed steel sheet having a good surface appearance and good bendability can be produced at low cost by just changing the operation conditions of an existing continuous galvanized steel sheet production line.

DETAILED DESCRIPTION OF EMBODIMENTS OF THE INVENTION

Embodiments of the present invention will be specifically described below.

In the following description, the contents of elements in the component composition of steel and the contents of elements in the component composition of a coated layer are given in units of "percent by mass" and expressed simply as "%", unless otherwise specified. An $O_2$ concentration, a $H_2O$ concentration, and a $H_2$ concentration are given in units of "percent by volume" or "ppm by volume" and expressed as "%" or "ppm", unless otherwise specified.

A Mn-containing galvannealed steel sheet of an embodiment the present invention includes a steel sheet containing, on a mass % basis, C: 0.03% to 0.35%, Si: 0.01% to 2.00%, Mn: 3.0% to 8.0%, Al: 0.001% to 1.000%, P: 0.10% or less, and S: 0.01% or less, the balance being Fe and incidental impurities, the steel sheet including a zinc coated layer on one or both surfaces thereof in a coating weight of 20 to 120 $g/m^2$, in which the zinc coated layer contains any one of a) to e) described below, a) an oxide containing Fe and Mn, b) an oxide containing Fe and Mn and an Fe oxide, c) an oxide containing Fe and Mn and a Mn oxide, d) an oxide containing Fe and Mn, an Fe oxide, and a Mn oxide, and e) an Fe oxide and a Mn oxide, a total amount of the oxide is 0.01 to 0.100 $g/m^2$ in terms of the amount of O, the ratio by mass % of Mn to Fe, i.e., Mn/Fe, contained in the oxide is 0.10 to 10.00, the oxide of at least one selected from Fe and Mn is present in an amount of 60% or more in terms of a cross-sectional area fraction in a range from a surface of the zinc coated layer to a position 50% or less of the total thickness of the zinc coated layer, and an oxide of at least one selected from Fe and Mn is present in a steel sheet surface layer portion in an amount of 0.040 $g/m^2$ or less (not including zero) in terms of the amount of O, the steel sheet surface layer portion extending from a surface of the underlying steel sheet directly below the zinc coated layer to a position 5 μm or less from the surface.

Reasons for the limitation of the component composition of steel of the Mn-containing galvannealed steel sheet according an embodiment of the present invention will be described below.

C: 0.03% to 0.35%

C has the effect of enhancing the strength of a steel sheet. To provide the effect, a C content of 0.03% or more is required. A C content of more than 0.35% results in the degradation of weldability, which is required when the steel sheet is used as a material for automobiles and household appliances. Thus, the C content is 0.03% or more and 0.35% or less.

Si: 0.01% to 2.00%

Si is an element effective in strengthening steel and improving ductility. To provide the effects, a Si content of 0.01% or more is required. A Si content of more than 2.00% results in the formation of an oxide of Si on the surfaces to degrade the coating appearance. Thus, the Si content is 0.01% or more and 2.00% or less.

Mn: 3.0% to 8.0%

Mn is an element that stabilizes an austenite phase and significantly improves ductility. Thus Mn is an important element in the present invention. To provide the effects, a Mn content of 3.0% or more is required. A Mn content of more than 8.0% results in the degradation of slab casting performance and weldability. Thus, the Mn content is 3.0% or more and 8.0% or less.

Al: 0.001% to 1.000%

Al is contained for the purpose of deoxidizing molten steel. At an Al content of less than 0.001%, the purpose is not achieved. An Al content of more than 1.000% results in the formation of an oxide of Al on the surfaces to degrade the coating appearance (surface appearance). Thus, the Al content is 0.001% or more and 1.000% or less.

P: 0.10% or Less

P is one of elements inevitably contained. To achieve a P content of less than 0.005%, the cost may be increased. Thus, the P content is preferably 0.005% or more. Slab productivity is degraded with an increase in P content. The presence of P inhibits an alloying reaction to cause uneven coating. To inhibit these problems, a P content of 0.10% or less is required. Thus, the P content is 0.10% or less, preferably 0.05% or less.

S: 0.01% or Less

S is an element inevitably contained in the steel-making process. However, a high S content results in the degradation of weldability. Thus, the S content is 0.01% or less.

The balance is Fe and incidental impurities.

To provide the following effects, the steel sheet may contain one or more elements selected from B: 0.001% to 0.005%, Nb: 0.005% to 0.050%, Ti: 0.005% to 0.080%, Cr: 0.001% to 1.000%, Mo: 0.05% to 1.00%, Cu: 0.05% to 1.00%, Ni: 0.05% to 1.00%, and Sb: 0.001% to 0.200%, as needed.

In the case of adding these elements, the appropriate contents thereof and reasons for the limitation of the contents are described below.

B: 0.001% to 0.005%

A B content of 0.001% or more results in the effect of promoting hardenability. A B content of more than 0.005% results in the degradation of chemical conversion treatability. Thus, when B is contained, the B content is 0.001% or more and 0.005% or less.

Nb: 0.005% to 0.050%

A Nb content of 0.005% or more results in the effect of adjusting the strength (improving the strength). A Nb content of more than 0.050% results in an increase in cost. Thus, when Nb is contained, the Nb content is 0.005% or more and 0.050% or less.

Ti: 0.005% to 0.080%

A Ti content of 0.005% or more results in the effect of adjusting the strength (improving the strength). A Ti content of more than 0.080% leads to the degradation of chemical conversion treatability. Thus, when Ti is contained, the Ti content is 0.005% or more and 0.080% or less.

Cr: 0.001% to 1.000%

A Cr content of 0.001% or more results in the hardening effect. A Cr content of more than 1.000% results in degradation of weldability because Cr is concentrated on the surfaces. Thus, when Cr is contained, the Cr content is 0.001% or more and 1.000% or less.

Mo: 0.05% to 1.00%

A Mo content of 0.05% or more results in the effect of adjusting the strength (improving the strength). A Mo content of more than 1.00% leads to an increase in cost. Thus, when Mo is contained, the Mo content is 0.05% or more and 1.00% or less.

Cu: 0.05% to 1.00%

A Cu content of 0.05% or more results in the effect of promoting the formation of a retained γ phase. A Cu content of more than 1.00% leads town increase in cost. Thus, when Cu is contained, the Cu content is 0.05% or more and 1.00% or less.

Ni: 0.05% to 1.00%

A Ni content of 0.05% or more results in the effect of promoting the formation of a retained γ phase. A Ni content of more than 1.00% leads to an increase in cost. Thus, when Ni is contained, the Ni content is 0.05% or more and 1.00% or less.

Sb: 0.001% to 0.200%

Sb may be used to inhibit nitriding or oxidation of surfaces of a steel sheet or decarbonization due to oxidation in regions extending from the surfaces of the steel sheet to positions several tens of micrometers from the surfaces. The inhibition of nitriding or oxidation inhibits a decrease in the amount of martensite formed on the surfaces of the steel sheet to improve fatigue characteristics and surface quality. These effects are provided at an Sb content of 0.001% or more. An Sb content of 0.200% or more results in the degradation of toughness. Thus, when Sb is contained, the Sb content is 0.001% or more and 0.200% or less.

An oxide distribution in the Mn-containing galvannealed steel sheet of an embodiment of the present invention will be described below.

In the Mn-containing galvannealed steel sheet of the present invention, an oxide of at least one selected from Fe and Mn is present in the zinc coated layer in an amount of 0.01 to 0.100 g/m$^2$ in terms of the amount of O. The oxide at least one selected from Fe and Mn is present in an amount of 60% or more in terms of a cross-sectional area fraction in a range from a surface of the zinc coated layer to a position 50% or less of the total thickness of the zinc coated layer. The ratio by mass % of Mn to Fe, i.e., Mn/Fe, contained in the oxide is 0.10 to 10.00. The oxide of at least one selected from Fe and Mn is present in a steel sheet surface layer portion in an amount of 0.040 g/m$^2$ or less (not including zero) in terms of the amount of O, the steel sheet surface layer portion extending from a surface of the underlying steel sheet directly below the zinc coated layer to a position 5 μm or less from the surface.

An Oxide of at Least One Selected from Fe and Mn Being Present in the Zinc Coated Layer in an Amount of 0.01 to 0:100 g/m$^2$ in Terms of the Amount of O The oxide of at least one selected from Fe and Mn contained in the zinc coated layer is exposed on the surfaces of the steel sheet (Mn-containing galvannealed steel sheet) during bending and functions as a lubricant on the surfaces of the steel sheet, thereby improving the bendability. To provide the effect, 0.01 g/m$^2$ or more of the oxide in terms of the amount of O is required. If the oxide is present in an amount of more than 0.100 g/m$^2$, the corrosion resistance is degraded. Thus, the amount of the oxide of at least one selected from Fe and Mn in the zinc coated layer is 0.01 to 0.100 g/m$^2$ in terms of the amount of O.

The oxide of at least one selected from Fe and Mn refers to one or more of a) to e):

a) an oxide containing Fe and Mn,
b) an oxide containing Fe and Mn and an Fe oxide,
c) an oxide containing Fe and Mn and a Mn oxide,
d) an oxide containing Fe and Mn, an Fe oxide, and a Mn oxide, and
e) an Fe oxide and a Mn oxide.

The amount of the oxide can be measured by a method described in examples below.

The Oxide at Least One Selected from Fe and Mn Being Present in an Amount of 60% or More in Terms of a Cross-Sectional Area Fraction in a Range from a Surface of the Zinc Coated Layer to a Position 50% or Less of the Total Thickness of the Zinc Coated Layer When the oxide at least one selected from Fe and Mn is present in an amount of 60% or more in terms of a cross-sectional area fraction in a range from a surface of the zinc coated layer to a position 50% or less of the total thickness of the zinc coated layer, the bendability is further improved. Thus, the amount of the oxide at least one selected from Fe and Mn present in the range from the surface of the zinc coated layer to the position 50% or less of the total thickness of the zinc coated layer is 60% or more in terms of the cross-sectional area fraction, preferably 80% or more.

The cross-sectional area fraction of the oxide can be measured by a method described in examples below.

The Ratio by Mass % of Mn to Fe, i.e., Mn/Fe, Contained in the Oxide is 0.10 to 10.00

A higher Mn/Fe ratio of the oxide results in further improved bendability. The reason for this is presumably that the Mn oxide has a higher melting point than the Fe oxide and does not easily adhere during processing to reduce the coefficient of friction. To achieve sufficient bendability, the Mn/Fe is required to be 0.10 or more. To obtain a Mn/Fe ratio of more than 10.00, FeO is required to be further reduced. To this end, an atmosphere and the steel sheet temperature in a furnace are required to be set so as to promote further reduction, which is difficult in view of cost and facilities.

The Mn/Fe can be measured by a method described in examples below.

The Oxide of at Least One Selected from Fe And Mn Being Present in a Steel Sheet Surface Layer Portion in an Amount of 0.040 g/m$^2$ or Less (Not Including Zero) in Terms of the Amount of O, the Steel Sheet Surface Layer Portion Extending from a Surface of the Underlying Steel Sheet Directly Below the Zinc Coated Layer to a Position 5 μm or Less from the Surface When the oxide of at least one, selected from Fe and Mn is present in a steel sheet surface layer portion in an amount of more than 0.040 g/m$^2$ in terms of the amount of O, the steel sheet surface layer portion extending from a surface of the underlying steel sheet directly below the zinc coated layer to a position 5 μm or less from the surface, the steel sheet has degraded bendability. Thus, the amount of the oxide of at least one selected from Fe and Mn present in the steel sheet surface layer portion extending from the surface of the underlying steel sheet directly below the zinc coated layer to the position 5 μm or less from the surface is 0.040 g/m$^2$ or less (not including zero) in terms of the amount of O, preferably 0.020 g/m$^2$ or less.

The amount of the oxide can be measured by a method described in examples below.

A method for producing the Mn-containing galvannealed steel sheet according to an embodiment of the present invention will be described below. The steel sheet having the component composition described above is subjected to galvanizing treatment and then alloying treatment. In the case of subjecting the steel sheet to coating treatment in the present invention, a heating step A, a heating step B, and a heating step C are successively performed, and then hot-dip galvanizing treatment is performed, the heating step A being a step of heating the steel sheet at 60° C. to 250° C. and holding the steel sheet at a steel sheet temperature of 60° C. to 250° C. for 10 to 60 seconds in an atmosphere having an $O_2$ concentration of 1.0% to 5.0% by volume and a $H_2O$ concentration of 10% to 30% by volume, the balance being at least one selected from $N_2$, $CO_2$, CO, and $H_2$ and incidental impurities, the heating step B being a step of heating the steel sheet at 550° C. to 700° C. and holding the steel sheet at a steel sheet temperature of 550° C. to 700° C. for 30 seconds or less in a direct fired furnace (DFF) using a combustion gas having an air ratio of 1.00 to 1.20, the heating step C being a step of holding the steel sheet at 550° C. to 700° C. for 10 to 300 seconds in a reducing atmosphere having a $H_2$ concentration of 1% to 50% by volume, the balance being one or more selected $H_2O$, $N_2$, CO, and $CO_2$ and incidental impurities.

Details regarding an embodiment(s) will be described below.

Heating step A: In an atmosphere having an $O_2$ concentration of 1.0% to 5.0% by volume and a $H_2O$ concentration of 10% to 30% by volume, the balance being at least one selected from $N_2$, $CO_2$, CO, and $H_2$ and incidental impurities, the steel sheet is heated at 60° C. to 250° C. and held at a steel sheet temperature of 60° C. to 250° C. for 10 to 60 seconds.

The heating step A is a step of forming an oxide of Mn on surfaces of the steel sheet (base steel sheet).

An $O_2$ concentration of less than 1.0% by volume does not result in sufficient oxidation of Mn. An $O_2$ concentration of more than 5.0% by volume results in the oxidation of a Mn/Fe mixed oxide to cause uneven alloying. Thus, the $O_2$ concentration in the atmosphere in the heating step A is 1.0% or more by volume and 5.0% or less by volume.

A $H_2O$ concentration of less than 10% by volume does not result in sufficient oxidation of Mn. A $H_2O$ concentration of more than 30% by volume results in the oxidation of a Mn/Fe mixed oxide to cause uneven alloying. Thus, the $H_2O$ concentration in the atmosphere in the heating step A is 10% or more by volume and 30% or less by volume.

When the temperature at which the steel sheet is heated is lower than 60° C., sufficient oxidation is not provided. When the temperature is higher than 250° C., the oxide is a Mn/Fe mixed oxide, causing uneven alloying. Thus, the temperature at which the steel sheet is heated in the heating step A is 60° C. or higher and 250° C. or lower.

A holding time of less than 10 seconds does not result in sufficient oxidation of Mn. A holding time of more than 60 seconds results in a decrease in production efficiency. Thus, the holding time in the heating step A at a steel sheet temperature of 60° C. to 250° C. is 10 seconds or more and 60 seconds or less.

The term "holding time" used in the present invention refers to, for example, in the heating step A, the length of time that the steel sheet temperature is 60° C. to 250° C. and the length of time that the steel sheet passes through a region of a furnace having a temperature of 60° C. to 250° C.

Heating step B: In a direct fired furnace (DFF) using a combustion gas having an air ratio of 1.00 to 1.20, the steel sheet is heated at 550° C. to 700° C. and held at a steel sheet temperature of 550° C. to 700° C. for 30 seconds or less.

The heating step B is performed to form a desired amount of an Fe-based oxide film on each surface of the steel sheet (base steel sheet) and a desired amount of an internal oxide inside the steel sheet.

When the air ratio of the combustion gas in the DFF is more than 1.20, the internal oxide is formed to a depth of 1 μm or more from the surfaces of the steel sheet in the thickness direction to cause a large amount of the oxide to be left in the vicinity of each of the surfaces of the steel sheet after alloying, thus degrading the bendability. When the air ratio is less than 1.00, the Fe-based oxide film cannot be sufficiently formed on each surface of the steel sheet. Thus, the air ratio of the combustion gas is 1.00 or more and 1.20 or less.

When the heating temperature with the DFF using the combustion gas having an air ratio of 1.00 to 1.20 is lower than 550° C., the Fe-based oxide film cannot be sufficiently formed on each surface of the steel sheet. When the heating temperature is higher than 700° C., an excess amount of the Fe-based oxide film is formed, the oxide film adheres to a roll in the furnace, and the oxide film is pressed against the steel sheet to cause flaws in the steel sheet. When the holding time at 550° C. to 700° C. is more than 30 seconds, the internal oxide is formed to a depth of 1 μm or more from the surfaces of the steel sheet in the thickness direction to cause a large amount of the oxide to be left in the vicinity of each of the surfaces of the steel sheet after alloying, thus degrading the bendability.

In the above description, preferably, after heating is performed in a DFF using a combustion gas having an air ratio of 1.00 to 1.20, heating is performed in the DFF using a combustion gas having an air ratio of 0.80 to 1.00. When heating is performed as described above, iron oxide on surface layers is reduced to prevent the adhesion of iron oxide to the roll in the furnace or flaws caused by pressing iron oxide against the steel sheet. The lower limit of the air ratio in the second heating is 0.80 in view of cost efficiency.

In the case where heating is performed in the DFF using the combustion gas having an air ratio of 0.80 to 1.00, a substep of heating the steel sheet with the combustion gas having an air ratio of 1.00 to 1.20 and a substep of heating the steel sheet with the combustion gas having an air ratio of 0.80 to 1.00 may be successively performed to heat the steel sheet at a temperature of 550° C. to 700° C., and then the steel sheet may be held at a steel sheet temperature of 550° C. to 700° C. for 30 seconds or less.

Regarding a method for changing the air ratio during heating, burners that can be operated at different air ratios may be arranged upstream and downstream, and the air ratio used for the burners in an upstream section may be different from that in a downstream section. Regarding the heating temperature, the temperature and the holding time described above may be satisfied while the steel sheet is exposed to the burners, regardless of whether the air ratio is changed or not.

Heating step C: The steel sheet is held at 550° C. to 700° C. for 10 to 300 seconds in a reducing atmosphere having a $H_2$ concentration of 1% to 50% by volume, the balance being one or more selected $H_2O$, $N_2$, CO, and $CO_2$ and incidental impurities.

The heating step C is performed to form a desired amount of the internal oxide inside the steel sheet while the reactivity of the steel sheet to a coating is improved by reducing the Fe-based oxide formed on the surfaces of the steel sheet (base steel sheet) in the heating step B to cover the surfaces with reduced iron.

A $H_2$ concentration of less than 1% by volume results in the inhibition of reduction of the Fe oxide on the surfaces of the steel sheet to degrade the appearance of the coating surface. A $H_2$ concentration of more than 50% by volume results in the saturation of the reduction effect and is inferior in costa Thus, the $H_2$ concentration in the atmosphere in the heating step C is 1% or more by volume and 50% or less by volume.

A holding temperature (maximum temperature of the steel sheet) of lower than 550° C. results in the inhibition of reduction of the Fe oxide on the surfaces of the steel sheet to degrade the appearance of the coating surface. A holding temperature of higher than 700° C. results in the formation of the internal oxide to a depth of 1 μm or more to cause a large amount of the oxide to be left in the vicinity of each of the surfaces of the steel sheet after alloying, thus degrading the bendability. Thus, the maximum temperature of the steel sheet, in accordance with an embodiment of the invention, in the heating step C is 550° C. or higher and 700° C. or lower.

A holding time of less than 10 seconds results in the inhibition of reduction of the Fe oxide on the surfaces of the steel sheet to degrade the appearance of the coating surface. A holding time of more than 300 seconds results in the formation of the internal oxide to a depth of 1 μm or more to cause a large amount of the oxide to be left in the vicinity of each of the surfaces of the steel sheet after alloying, thus degrading the bendability. Accordingly, the holding time (passage time of the steel sheet) at a steel sheet temperature 550° C. to 700° C. in the heating step C is 10 seconds or more and 300 seconds or less.

In the heating step C, the atmosphere preferably has a dew point of −60° C. to −20° C.

When the dew point of the atmosphere is lower than −60° C., facilities need to be improved, leading to an increase in cost. A dew point of higher than −20° C. may result in the formation of the internal oxide to a depth of 1 μm or more to cause a large amount of the oxide to be left in the vicinity of each of the surfaces of the steel sheet after alloying, thus degrading the bendability. Thus, the dew point of the atmosphere in the heating step C is preferably −60° C. or higher and −20° C. or lower.

After the step described above is performed, the steel sheet is cooled and subjected to hot-dip galvanizing by immersing the steel sheet in a hot-dip galvanizing bath. For the production of a hot-dip galvanized steel sheet, a galvanizing bath having a bath temperature of 440° C. to 550° C. and an Al content of 0.10% to 0.20% is preferably used.

A bath temperature of lower than 440° C. may result in the solidification of Zn in a portion of the bath with large variations in temperature. A bath temperature of higher than 550° C. results in significant evaporation of the bath to cause operational problems, such as high operation costs and the deposition of vaporized Zn onto the inside of a furnace. Furthermore, because alloying proceeds during hot-dip galvanizing, over-alloying occurs easily.

An Al concentration in the coating bath of less than 0.10% results in the formation of a large amount of ξ phase to degrade anti-powdering properties. At an Al concentration of more than 0.20%, Fe—Zn alloying does not proceed.

Subsequently, alloying treatment is performed. The alloying treatment is optimally performed at a steel sheet heating temperature of higher than 460° C. and lower than 570° C. At 460° C. or lower, alloying proceeds slowly. At 570° C. or higher; over-alloying results in the excessive formation of a hard, brittle Zn—Fe alloy layer at an interface with the steel sheet (base steel sheet), thereby degrading coating adhesion. Furthermore, because a retained austenite phase is decomposed, a balance between strength and ductility may be decreased.

The coating weight is 20 g/m² or more (coating weight per side) in view of corrosion resistance and the control of the coating weight. However, a high coating weight may result in low adhesion; thus, the coating weight is 120 g/m² or less (coating weight per side).

EXAMPLE 1

While the present invention will be specifically described below by examples, the present invention is not limited to these examples.

Slabs having steel component compositions listed in Table 1 were heated with a heating furnace at 1,260° C. for 60 minutes. Subsequently, each of the slabs was hot-rolled to a sheet thickness of 2.8 mm and coiled at 540° C. Mill scales were removed by pickling. The steel sheet was cold-rolled to a sheet thickness of 1.6 mm to provide a cold-rolled steel sheet.

Under conditions listed in Table 2, the resulting cold-rolled steel sheets were each subjected to a heating step A, a heating step B, and a heating step C with a continuous hot-dip galvanizing line including a direct fired furnace (DFF), a radiant tube furnace (RTF), and a cooling zone, and then each cold-rolled steel sheet was subjected to coating treatment and alloying treatment. As a fuel gas for the DFF, a C gas (a gas obtained by dry distillation of coal in a coke oven, COG gas) generated in a coke oven was used. As an atmosphere gas in a reducing furnace, a $H_2$—$N_2$ gas mixture was used.

The hot-dip galvanizing bath was adjusted so as to have a bath temperature of 500° C. and a composition containing an Al content of 0.1% by mass, the balance being Zn and incidental impurities. After the cold-rolled steel sheet was immersed in a hot-dip galvanizing bath, the coating weight was adjusted to 50 g/m² per side by gas wiping. The alloying treatment was performed by heating the steel sheet to 500° C. and holding the steel sheet at the temperature for 30 seconds with an IH heater.

With respect to the resulting galvannealed steel sheet (GA), the presence or absence of bare spots, the presence or absence of uneven alloying, and bendability were examined. The amount of O in an oxide in a coated layer, the cross-sectional area fraction of the oxide present in a range from a coating surface to a position 50% or less of the total thickness of the coated layer with respect to the oxide present in the coated layer, Mn/Fe of the oxide in the coated layer, and the amount of the oxide in surface layer portions of the steel sheet extending from the surfaces of the underlying steel sheet to positions 5 μm or less from the surfaces were measured. Measurement methods and evaluation criteria are described below.

<Presence or Absence of Bare Spot>

Randomly-selected five portions in a range of a 1-m² area were measured. When no bare spot was visually observed, the steel sheet was rated as good (symbol: ○). When a bare spot was visually observed, the steel sheet was rated as poor (symbol: ×).

<Presence or Absence of Uneven Alloying>

Five portions in a 1-m² area were measured. When no uneven alloying was visually observed, the steel sheet was rated as good (symbol: ○). When an uneven alloying was visually observed, the steel sheet was rated as poor (symbol: ×).

<Bendability>

A test piece measuring 30 mm×100 mm was cut from each galvannealed steel sheet. A sheared surface was mechanically polished. A 90° V-bending test was performed at bending radii of one time and two times the sheet thickness. The presence or absence of cracking, necking, and coating delamination were visually evaluated during the bending test. When none of cracking and coating delamination were observed at bending radii of one time and two times the sheet thickness, the test piece was rated as excellent (symbol: ⊙). When none of cracking, necking, and coating delamination were observed at a bending radius of two times the sheet thickness and when any of cracking, necking and coating delamination was observed at a bending radius of one time the sheet thickness, the test piece was rated as good (symbol: ○). When any of cracking, necking, and coating delamination was observed at bending radii of one time and two times of the sheet thickness, the test piece was rated as poor (symbol: ×). The test pieces rated as "excellent" and "good" were evaluated as passed.

<Amount of O in Oxide in Coated Layer>

The amount of O in the oxide in the coated layer was measured by an "impulse furnace fusion-infrared absorption method". However, the coated layer alone was required to be measured. Thus, for the examples of the present invention, the amount of O in the coated layer was determined as follows. The amount of oxide in the entire galvannealed steel sheet was measured. The measured value was expressed as OC. The coating was removed with a 10% by mass NaOH solution. The amount of oxygen in the resulting steel sheet was measured. The measured value was expressed as OH. The difference between the amount of oxygen OC in the galvannealed steel sheet and the amount of oxygen OH contained in the steel sheet (OC–OH) was calculated. The difference was converted into a value ($g/m^2$) per unit area of a side (i.e., 1 $m^2$). The converted value was defined as the amount of O in the oxide in the coated layer.

<Cross-Sectional Area Fraction of Oxide Present in Range from Coating Surface to Position 50% or Less of Total Thickness of Coated Layer with Respect to Oxide Present in Coated Layer>

A cross section of the coated layer was exposed by polishing. A reflected electron image was photographed with a scanning electron microscope (SEM). The oxide contains O and thus appears black in the photographed reflected electron image, so that the oxide can be easily distinguished from the coated layer. Alternatively, they may be distinguished by energy dispersive X-ray spectroscopy (EDX). The captured image was digitized. Portions having a brightness level corresponding to that of the oxide were extracted by image analysis to form a binarized image. A region extending from the coating surface to a position 50% of the total thickness of the coating was defined by calculation from the surface shape of the coated layer and the shape of the interface between the steel sheet and the coated layer. The cross-sectional area of all the oxide and the cross-sectional area of the oxide present in the region were measured. The cross-sectional area of the oxide in the region/the cross-sectional area of all the oxide was defined as the cross-sectional area fraction of the oxide present in the range extending form the coating surface to the position 50% or less with respect to the oxide present in the coated layer.

<Mn/Fe of Oxide in Coated Layer>

The coated layer alone was subjected to anodic dissolution. The residual oxide was extracted and dissolved in hydrochloric acid. The Fe content (mass %) and the Mn content (mass %) in the resultant hydrochloric acid were measured by ICP. The ratio (Mn (mass %)/Fe (mass %)) was defined as the ratio by mass % of Mn to Fe, i.e., Mn/Fe, contained in the oxide in the coated layer.

<Amount of O in Oxide in Steel Sheet Surface Layer Portion Extending from Surface of Underlying Steel Sheet to Position 5 µm or Less from Surface>

The amount of the oxide in regions extending from the surfaces of the underlying steel sheet to positions 5 µm or less from the surfaces was measured by an "impulse furnace fusion-infrared absorption method". The coating was removed with a 10% by mass NaOH solution. The amount of oxygen in the resulting steel sheet was measured. The measured value was expressed as OH. The front and back sides of the steel sheet whose coating had been removed were polished by 5 to 10 µm. The amount of oxygen in the polished sample was measured. The measured value was expressed as OG. The difference between the amount of oxygen (OH) in the steel sheet and the amount of oxygen (OG) in the steel sheet whose front and back sides had been polished by 5 to 10 µm (OH–OG) was calculated. The difference was converted into a value ($g/m^2$) per unit area of a side (i.e., 1 $m^2$). The converted value was defined as the amount of O in the oxide in the region extending from the surface of the underlying steel sheet to the position 5 µm or less from the surface.

Table 2 lists the results obtained above in combination with production conditions.

TABLE 1

| | Chemical composition of steel (% by mass, balance being Fe and impurities) | | | | | | | | | | | | | | Example or comparative example |
|---|---|---|---|---|---|---|---|---|---|---|---|---|---|---|---|
| | C | Mn | Si | P | S | Al | B | Nb | Ti | Cr | Mo | Cu | Ni | Sb | |
| A | 0.12 | 5.2 | 0.52 | 0.04 | 0.004 | 0.030 | — | — | — | — | — | — | — | — | Example |
| B | 0.16 | 5.7 | 0.24 | 0.06 | 0.005 | 0.480 | — | — | — | — | — | — | — | — | Example |
| C | 0.22 | 6.4 | 1.16 | 0.07 | 0.008 | 0.570 | — | — | — | — | — | — | — | — | Example |
| D | 0.28 | 7.8 | 0.01 | 0.02 | 0.006 | 0.490 | — | — | — | — | — | — | — | — | Example |
| E | 0.1 | 3.2 | 1.38 | 0 | 0.005 | 0.110 | — | — | — | — | — | — | — | — | Example |
| F | 0.03 | 7.1 | 0.41 | 0.07 | 0.010 | 0.120 | 0.003 | — | — | — | — | — | — | — | Example |
| G | 0.17 | 4.6 | 1.49 | 0.09 | 0.006 | 0.370 | — | 0.020 | — | — | — | — | — | — | Example |
| H | 0.10 | 5.1 | 0.23 | 0.06 | 0.008 | 0.870 | — | — | 0.030 | — | — | — | — | — | Example |
| I | 0.16 | 5.8 | 1.07 | 0.01 | 0.007 | 0.730 | — | — | — | 0.600 | — | — | — | — | Example |
| J | 0.02 | 3.6 | 0.41 | 0.05 | 0.008 | 0.630 | — | — | — | — | 0.200 | — | — | — | Example |
| K | 0.11 | 7.5 | 0.92 | 0.04 | 0.004 | 0.600 | — | — | — | — | — | 0.600 | — | — | Example |
| L | 0.16 | 4.2 | 1.33 | 0.02 | 0.006 | 0.610 | — | — | — | — | — | — | 0.200 | — | Example |
| M | 0.22 | 4.6 | 0.71 | 0.07 | 0.001 | 0.580 | — | — | — | — | — | — | — | 0.200 | Example |
| XA | 0.11 | <u>8.5</u> | 0.04 | 0.02 | 0.006 | 0.030 | — | — | — | — | — | — | — | — | Comparative example |

TABLE 1-continued

| | Chemical composition of steel (% by mass, balance being Fe and impurities) | | | | | | | | | | | | | | Example or comparative example |
|---|---|---|---|---|---|---|---|---|---|---|---|---|---|---|---|
| | C | Mn | Si | P | S | Al | B | Nb | Ti | Cr | Mo | Cu | Ni | Sb | |
| XB | 0.22 | <u>2.4</u> | 0.3 | 0.01 | 0.003 | 0.020 | — | — | — | — | — | — | — | — | Comparative example |
| XC | 0.28 | 5.2 | <u>2.1</u> | 0.03 | 0.007 | 0.040 | — | — | — | — | — | — | — | — | Comparative example |

*Values outside the range of the present invention are underlined.

TABLE 2

| | | Production conditions | | | | | | | | |
|---|---|---|---|---|---|---|---|---|---|---|
| | | Heating step A | | | | Heating step B | | | | Heating step C |
| No. | Type of steel | $O_2$ concentration in atmosphere (vol %) | $H_2O$ concentration in atmosphere (vol %) | Heating temperature (°C.) | Holding time at steel sheet temperature of 60° C. to 250° C. (s) | Air ratio of combustion gas in DFF | Heating temperature (°C.) | Holding time at steel sheet temperature of 550° C. to 700° C. (s) | $H_2$ concentration in atmosphere (vol %) | Heating temperature (°C.) |
| 1 | A | <u>8.2</u> | 13.5 | 160 | 48 | 1.17 | 605 | 24 | 10 | 599 |
| 2 | C | 3.7 | 10.5 | 170 | 17 | 1.05 | <u>750</u> | 11 | 10 | 690 |
| 3 | A | 3.8 | 15.6 | 200 | 32 | 1.12 | <u>643</u> | 5 | 5 | 656 |
| 4 | D | 1.6 | 29.9 | 200 | 70 | 1.15 | 647 | 22 | 10 | 655 |
| 5 | A | <u>0.5</u> | 17.2 | 170 | 23 | 1.02 | 661 | 20 | 10 | 672 |
| 6 | C | 4.9 | 11.0 | 240 | 60 | 1.14 | <u>788</u> | 16 | 10 | 697 |
| 7 | D | 4.1 | 17.8 | 150 | 55 | 1.06 | <u>562</u> | 25 | 10 | <u>450</u> |
| 8 | D | 4.7 | <u>34.3</u> | 130 | 34 | 1.12 | 672 | 10 | 10 | <u>615</u> |
| 9 | A | <u>5.8</u> | 14.5 | 200 | 18 | 1.19 | <u>559</u> | 16 | 10 | <u>535</u> |
| 10 | C | 2.5 | 18.6 | 200 | 56 | 1.12 | 646 | 7 | 10 | 680 |
| 11 | E | 3.7 | 23.0 | 160 | 41 | 1.06 | 672 | 21 | 10 | 655 |
| 12 | C | 2.6 | 25.6 | 240 | 79 | 1.11 | 623 | <u>45</u> | 10 | 608 |
| 13 | D | 1.3 | 19.3 | 160 | 65 | 1.20 | 653 | 23 | 10 | <u>780</u> |
| 14 | E | 2.9 | 15.8 | <u>320</u> | 50 | 1.13 | 556 | 11 | 10 | 629 |
| 15 | C | 1.7 | 14.0 | <u>50</u> | 33 | 1.02 | <u>535</u> | <u>60</u> | 10 | 553 |
| 16 | E | 1.2 | 22.4 | 200 | 36 | 1.03 | <u>552</u> | 28 | 10 | 626 |
| 17 | B | 2.5 | 20.1 | 250 | 68 | <u>0.91</u> | 605 | 1 | 10 | <u>720</u> |
| 18 | C | 2.1 | 27.1 | 210 | 69 | 1.07 | <u>520</u> | 13 | 10 | 654 |
| 19 | E | 4.5 | 10.5 | 200 | 11 | 1.06 | 580 | 24 | 10 | 578 |
| 20 | B | 1.7 | 19.1 | 140 | 54 | <u>1.38</u> | 647 | 20 | 10 | 614 |
| 21 | E | <u>0.7</u> | 29.8 | 240 | 20 | 1.17 | 686 | 23 | 10 | 577 |
| 22 | A | 3.8 | 22.1 | <u>270</u> | 36 | 1.14 | 613 | 14 | 10 | 592 |
| 23 | D | <u>10.7</u> | 22.6 | 100 | 49 | 1.03 | 614 | 8 | 10 | <u>520</u> |
| 24 | B | 3.1 | 17.2 | 130 | 28 | <u>1.33</u> | 649 | <u>34</u> | 10 | 662 |
| 25 | E | 3.5 | 24.9 | 220 | 58 | 1.11 | 598 | 30 | 10 | 672 |
| 26 | D | 3.4 | 25.4 | 220 | 13 | 1.15 | 565 | 5 | 10 | <u>710</u> |
| 27 | D | 1.8 | 14.8 | 240 | 63 | 1.19 | 570 | 11 | 10 | <u>750</u> |
| 28 | A | 4.2 | 13.4 | 130 | 47 | 1.12→0.92 | 602 | 7 | 1 | 586 |
| 29 | C | 1.7 | 29.9 | 190 | 61 | 1.19 | 650 | <u>50</u> | 10 | 605 |
| 30 | B | 3.5 | 23.7 | 110 | 43 | 1.02 | 671 | <u>3</u> | 20 | 690 |
| 31 | C | 1.2 | 20.1 | 210 | 43 | 1.20 | 635 | 21 | 40 | 626 |
| 32 | D | 3.7 | 18.2 | 170 | 55 | 1.17→0.86 | 690 | 7 | 10 | 695 |
| 33 | A | <u>0.2</u> | 27.7 | 210 | 58 | <u>0.88</u> | 613 | 28 | 10 | 591 |
| 34 | D | 2.3 | <u>7.2</u> | 150 | 25 | 1.15 | 648 | 10 | 10 | 670 |
| 35 | D | 2.4 | 18.8 | <u>40</u> | 48 | 1.17 | 630 | 11 | 10 | <u>480</u> |
| 36 | B | 1.7 | 11.3 | <u>40</u> | 68 | 1.07 | 613 | 16 | 10 | 666 |
| 37 | E | 3.4 | 14.2 | 170 | <u>5</u> | 1.04 | 630 | 12 | 10 | 645 |
| 38 | B | 4.6 | 23.6 | 220 | 24 | 1.03 | 641 | 24 | 30 | 658 |
| 39 | B | <u>7.2</u> | 26.5 | <u>50</u> | 71 | 1.05 | <u>530</u> | 22 | 10 | 607 |
| 40 | E | 3.2 | 29.7 | 160 | 20 | 1.10 | 610 | 11 | 10 | 673 |
| 41 | C | 1.4 | 27.1 | 150 | 38 | 1.06 | <u>480</u> | 3 | 10 | 676 |
| 42 | B | 3.4 | 14.2 | 170 | 33 | <u>0.95</u> | 602 | 7 | 10 | 622 |
| 43 | A | <u>0.8</u> | 13.2 | 210 | 51 | 1.01 | <u>730</u> | 30 | 10 | 574 |
| 44 | E | 1.7 | 22.0 | 140 | 56 | 1.04 | 613 | 24 | 10 | 645 |
| 45 | A | 1.1 | 13.2 | <u>350</u> | 56 | 1.10 | 573 | 24 | 10 | <u>515</u> |
| 46 | F | 4.5 | 25.9 | 160 | 71 | 1.14 | 626 | 21 | 10 | 632 |
| 47 | G | 2.7 | 18.1 | 120 | 33 | 1.03 | 624 | 30 | 10 | 568 |
| 48 | H | 1.3 | 11.0 | 60 | 71 | 1.10 | 556 | 27 | 10 | 691 |
| 49 | I | 4.2 | 11.1 | 70 | 78 | 1.18 | 553 | 0 | 10 | 674 |
| 50 | J | 3.3 | 20.0 | 100 | 52 | 1.13 | 677 | 8 | 10 | 614 |
| 51 | K | 1.6 | 10.8 | 80 | 23 | 1.01 | 616 | 27 | 10 | 647 |

TABLE 2-continued

| No. | | | | | | | | | |
|---|---|---|---|---|---|---|---|---|---|
| 52 | L | 2.2 | 17.6 | 110 | 13 | 1.04 | 576 | 23 | 10 | 673 |
| 53 | M | 1.5 | 18.1 | 160 | 26 | 1.15 | 561 | 5 | 10 | 661 |
| 54 | N | 4.0 | 16.3 | 180 | 16 | 1.03 | 636 | 29 | 10 | 656 |
| 55 | O | 1.2 | 24.5 | 210 | 42 | 1.16 | 696 | 15 | 10 | 602 |
| 56 | XA | 3.3 | 11.9 | 210 | 17 | 1.08 | 613 | 5 | 10 | 633 |
| 57 | XB | 4.1 | 26.5 | 200 | 35 | 1.11 | 569 | 17 | 10 | 641 |
| 58 | XC | 2.9 | 17.3 | 130 | 18 | 1.04 | 686 | 23 | 10 | 651 |

Galvannealed steel sheet

| No. | Production conditions Heating step C Holding time (s) | Dew point of atmosphere (° C.) | Presence or absence of bare spot | Presence or absence of uneven alloying | Bend-ability | Total amount of O in oxide in coated layer (g/m²) | Amount of O in oxide in region extending from surface of underlying steel sheet to position 5 μm or less from surface (g/m²) | Cross-sectional area fraction of oxide present in range from coating surface to position 50% or less of total thickness of coated layer with respect to oxide present in coated layer (%) | Mn/Fe of oxide in coated layer | Example or comparative example |
|---|---|---|---|---|---|---|---|---|---|---|
| 1 | 268 | −43 | ○ | X | X | 0.084 | 0.010 | <u>31</u> | <u>0.07</u> | Comparative example |
| 2 | 61 | −44 | ○ | ○ | X | 0.058 | <u>0.048</u> | 92 | 9.80 | Comparative example |
| 3 | 100 | −53 | ○ | ○ | ⊚ | 0.050 | 0.004 | 94 | 7.45 | Example |
| 4 | 159 | −30 | ○ | ○ | ⊚ | 0.065 | 0.004 | 76 | 2.69 | Example |
| 5 | 160 | −57 | ○ | X | X | 0.021 | 0.012 | <u>28</u> | <u>0.26</u> | Comparative example |
| 6 | <u>5</u> | −56 | X | ○ | X | 0.033 | <u>0.082</u> | 61 | <u>0.22</u> | Comparative example |
| 7 | 60 | −24 | ○ | X | X | 0.063 | 0.010 | 81 | <u>0.04</u> | Comparative example |
| 8 | 110 | −35 | ○ | X | ⊚ | 0.050 | <u>0.048</u> | 74 | 4.75 | Comparative example |
| 9 | 157 | −53 | ○ | X | X | 0.026 | 0.002 | <u>45</u> | <u>0.22</u> | Comparative example |
| 10 | 235 | −56 | ○ | ○ | ⊚ | 0.063 | 0.012 | 74 | 5.43 | Example |
| 11 | <u>325</u> | −38 | X | ○ | X | <u>0.120</u> | 0.020 | 89 | 6.81 | Comparative example |
| 12 | 90 | −33 | ○ | ○ | X | 0.097 | <u>0.054</u> | 94 | 8.46 | Comparative example |
| 13 | 176 | <u>−10</u> | X | ○ | X | 0.018 | <u>0.048</u> | 71 | 3.25 | Comparative example |
| 14 | 211 | <u>−5</u> | ○ | X | X | 0.086 | <u>0.066</u> | 62 | 1.72 | Comparative example |
| 15 | 141 | <u>−23</u> | X | X | X | 0.054 | <u>0.072</u> | <u>31</u> | <u>0.03</u> | Comparative example |
| 16 | <u>5</u> | −56 | X | ○ | ○ | 0.038 | 0.008 | 69 | <u>0.02</u> | Comparative example |
| 17 | <u>11</u> | −38 | X | X | X | <u>0.002</u> | 0.018 | 88 | 7.17 | Comparative example |
| 18 | <u>8</u> | −59 | X | ○ | ○ | 0.043 | 0.002 | 82 | <u>0.03</u> | Comparative example |
| 19 | <u>5</u> | −32 | X | ○ | ○ | 0.088 | 0.008 | 68 | <u>0.02</u> | Comparative example |
| 20 | 174 | −41 | ○ | ○ | X | 0.098 | <u>0.142</u> | 61 | 0.50 | Comparative example |
| 21 | <u>355</u> | −47 | X | X | X | 0.022 | 0.018 | <u>43</u> | <u>0.02</u> | Comparative example |
| 22 | 136 | −50 | ○ | X | X | 0.028 | 0.004 | <u>37</u> | <u>0.02</u> | Comparative example |
| 23 | 75 | −28 | ○ | X | X | 0.059 | 0.012 | <u>34</u> | <u>0.03</u> | Comparative example |
| 24 | 266 | −55 | ○ | ○ | X | 0.043 | <u>0.064</u> | 67 | 1.84 | Comparative example |
| 25 | 22 | −57 | ○ | ○ | ⊚ | 0.042 | 0.010 | 71 | 8.67 | Example |
| 26 | 152 | −46 | X | ○ | ○ | 0.045 | 0.008 | 89 | <u>11.33</u> | Comparative example |
| 27 | 29 | −25 | X | ○ | ○ | 0.078 | 0.018 | 64 | <u>12.83</u> | Comparative example |
| 28 | 224 | −41 | ○ | ○ | ⊚ | 0.020 | 0.008 | 96 | 7.33 | Example |
| 29 | 85 | −51 | ○ | ○ | X | 0.078 | <u>0.064</u> | 71 | 4.14 | Comparative example |
| 30 | 27 | −21 | ○ | ○ | ⊚ | 0.024 | 0.006 | 71 | 3.58 | Example |
| 31 | 83 | −44 | ○ | ○ | ⊚ | 0.039 | 0.016 | 88 | 7.05 | Example |
| 32 | 172 | −21 | ○ | ○ | ⊚ | 0.057 | 0.020 | 78 | 1.64 | Example |
| 33 | 24 | −21 | X | X | X | 0.021 | 0.016 | 62 | <u>0.01</u> | Comparative example |
| 34 | 108 | −45 | ○ | X | ⊚ | 0.040 | 0.004 | 72 | <u>13.84</u> | Comparative example |
| 35 | 216 | −54 | ○ | X | X | 0.015 | 0.016 | <u>32</u> | <u>0.05</u> | Comparative example |
| 36 | 168 | −50 | ○ | X | X | 0.090 | 0.014 | 61 | <u>0.07</u> | Comparative example |
| 37 | 105 | −32 | ○ | X | ⊚ | 0.078 | 0.006 | 78 | <u>12.51</u> | Comparative example |
| 38 | 71 | −45 | ○ | ○ | ⊚ | 0.061 | 0.010 | 81 | 3.62 | Example |
| 39 | 63 | −22 | ○ | X | X | 0.071 | 0.012 | <u>28</u> | <u>0.04</u> | Comparative example |
| 40 | 257 | −42 | ○ | ○ | ⊚ | 0.023 | 0.006 | 81 | 5.31 | Example |
| 41 | 282 | −43 | X | ○ | X | <u>0.005</u> | 0.010 | 67 | 2.65 | Comparative example |
| 42 | 179 | −59 | X | ○ | ⊚ | 0.096 | 0.012 | 78 | <u>12.83</u> | Comparative example |
| 43 | 27 | −56 | ○ | X | X | 0.047 | <u>0.048</u> | <u>50</u> | <u>0.06</u> | Comparative example |
| 44 | 141 | <u>−8</u> | ○ | ○ | ○ | 0.058 | 0.034 | 75 | 4.75 | Example |
| 45 | 19 | <u>−15</u> | ○ | X | X | 0.030 | 0.036 | <u>32</u> | <u>0.06</u> | Comparative example |
| 46 | 96 | −25 | ○ | ○ | ⊚ | 0.021 | 0.010 | 85 | 7.18 | Example |
| 47 | 213 | −33 | ○ | ○ | ⊚ | 0.040 | 0.018 | 84 | 3.21 | Example |

TABLE 2-continued

| | | | | | | | | | | | |
|---|---|---|---|---|---|---|---|---|---|---|---|
| 48 | 154 | −34 | ○ | ○ | ⊚ | 0.068 | 0.020 | 91 | 2.19 | Example |
| 49 | 211 | −20 | ○ | ○ | ⊚ | 0.041 | 0.008 | 93 | 8.61 | Example |
| 50 | 277 | −39 | ○ | ○ | ⊚ | 0.038 | 0.006 | 83 | 3.94 | Example |
| 51 | 202 | −28 | ○ | ○ | ⊚ | 0.012 | 0.002 | 89 | 4.35 | Example |
| 52 | 292 | −36 | ○ | ○ | ⊚ | 0.069 | 0.010 | 75 | 6.09 | Example |
| 53 | 178 | −57 | ○ | ○ | ⊚ | 0.059 | 0.016 | 79 | 5.22 | Example |
| 54 | 131 | −49 | ○ | ○ | ⊚ | 0.018 | 0.008 | 94 | 5.79 | Example |
| 55 | 134 | −41 | ○ | ○ | ⊚ | 0.061 | 0.010 | 72 | 4.05 | Example |
| 56 | 227 | −53 | X | ○ | ⊚ | 0.041 | 0.014 | 72 | 7.61 | Comparative example |
| 57 | 161 | −56 | ○ | ○ | X | 0.038 | 0.004 | 99 | 2.93 | Comparative example |
| 58 | 101 | −26 | X | X | ⊚ | 0.063 | 0.012 | 88 | 3.31 | Comparative example |

*Values outside the range of the present invention are underlined.

Table 2 indicates that the steel sheets of examples have good bendability and good surface appearance, despite the steel sheets containing a large amount of Mn.

In contrast, in comparative examples, at least either of bendability and coating appearance is poor.

INDUSTRIAL APPLICABILITY

The Mn-containing galvannealed steel sheet of the present invention has good surface appearance and good bendability and can be used as a surface-treated steel sheet to reduce the weight and increase the strength of automobile bodies. The Mn-containing galvannealed steel sheet of the present invention can be used as a surface-treated steel sheet obtained by imparting corrosion resistance to a base steel sheet in wide fields such as household appliances and construction materials in addition to automobiles.

The invention claimed is:

1. A Mn-containing galvannealed steel sheet, comprising a steel sheet containing, on a mass % basis:
   C: 0.03% to 0.35%;
   Si: 0.01% to 2.00%;
   Mn: 3.0% to 8.0%;
   Al: 0.001% to 1.000%;
   P: 0.10% or less; and
   S: 0.01% or less, the balance being Fe and incidental impurities, the steel sheet having a zinc coated layer on one or both surfaces thereof with a coating weight of 20 to 120 g/m$^2$,
   wherein the zinc coated layer contains a first oxide from any one of a) to e) described below,
   a) an oxide containing Fe and Mn,
   b) an oxide containing Fe and Mn and an Fe oxide,
   c) an oxide containing Fe and Mn and a Mn oxide,
   d) an oxide containing Fe and Mn, an Fe oxide, and a Mn oxide, and
   e) an Fe oxide and a Mn oxide,
   a total amount of the first oxide is 0.01 to 0.100 g/m$^2$ in terms of an amount of 0, a ratio by mass % of Mn to Fe contained in the oxide is 0.10 to 10.00,
   the first oxide is present in an amount of 60% or more of a cross-sectional area fraction in a range from a surface of the zinc coated layer to a position 50% or less of a total thickness of the zinc coated layer, and
   a second oxide selected from any one of a) to e) described above is present in a surface layer portion of the steel sheet in an amount of 0.040 g/m$^2$ or less, not including zero, in terms of an amount of 0, the surface layer portion of the steel sheet extending from a surface of the steel sheet underlying directly below the zinc coated layer to a position 5 μm or less from the surface thereof.

2. The Mn-containing galvannealed steel sheet according to claim 1, comprising the steel sheet further containing, on a mass % basis, one or more elements selected from:
   B: 0.001% to 0.005%;
   Nb: 0.005% to 0.050%;
   Ti: 0.005% to 0.080%;
   Cr: 0.001% to 1.000%;
   Mo: 0.05% to 1.00%;
   Cu: 0.05% to 1.00%;
   Ni: 0.05% to 1.00%; and
   Sb: 0.001% to 0.200%.

3. A method for producing the Mn-containing galvannealed steel sheet according to claim 1, the method comprising:
   a heating step A of heating the steel sheet at 60° C. to 250° C. and holding the steel sheet at a steel sheet temperature of 60° C. to 250° C. for 10 to 60 seconds in an atmosphere having an $O_2$ concentration of 1.0% to 5.0% by volume and a $H_2O$ concentration of 10% to 30% by volume, the balance being at least one selected from $N_2$, $CO_2$, CO, and $H_2$ and incidental impurities;
   a heating step B of heating the steel sheet at 550° C. to 700° C. and holding the steel sheet at a steel sheet temperature of 550° C. to 700° C. for 30 seconds or less in a direct fired furnace (DFF) with a combustion gas having an air ratio of 1.00 to 1.20;
   a heating step C of holding the steel sheet at 550° C. to 700° C. for 10 to 300 seconds in a reducing atmosphere having a $H_2$ concentration of 1% to 50% by volume, the balance being one or more selected from $H_2O$, $N_2$, CO, and $CO_2$ and incidental impurities;
   subjecting the steel sheet to a hot-dip galvanizing treatment by coating the steel sheet in a continuous hot-dip galvanizing line to form a galvanized steel sheet; and
   subjecting the galvanized steel sheet to an alloying treatment by annealing the galvanized steel sheet to form a galvannealed steel sheet,
   wherein the heating step A, the heating step B, and the heating step C are successively performed, and then hot-dip galvanizing treatment is performed.

4. The method for producing the Mn-containing galvannealed steel sheet according to claim 3, wherein in the heating step B, a substep of heating the steel sheet with a combustion gas having an air ratio of 1.00 to 1.20 and a substep of heating the steel sheet with a combustion gas having an air ratio of 0.80 to 1.00 are successively performed to heat the steel sheet at a temperature of 550° C. to 700° C.

5. The method for producing the Mn-containing galvannealed steel sheet according to claim 3, wherein in the heating step C, the atmosphere has a dew point of −60° C. to 20° C.

6. The method for producing the Mn-containing galvannealed steel sheet according to claim 3, wherein the alloying treatment heats the galvanized steel sheet at higher than 460° C. to lower than 570° C.

7. A method for producing the Mn-containing galvannealed steel sheet according to claim 2, the method comprising:
- a heating step A of heating the steel sheet at 60° C. to 250° C. and holding the steel sheet at a steel sheet temperature of 60° C. to 250° C. for 10 to 60 seconds in an atmosphere having an $O_2$ concentration of 1.0% to 5.0% by volume and a $H_2O$ concentration of 10% to 30% by volume, the balance being at least one selected from $N_2$, $CO_2$, CO, and $H_2$ and incidental impurities;
- a heating step B of heating the steel sheet at 550° C. to 700° C. and holding the steel sheet at a steel sheet temperature of 550° C. to 700° C. for 30 seconds or less in a direct fired furnace (DFF) with a combustion gas having an air ratio of 1.00 to 1.20;
- a heating step C of holding the steel sheet at 550° C. to 700° C. for 10 to 300 seconds in a reducing atmosphere having a $H_2$ concentration of 1% to 50% by volume, the balance being one or more selected from $H_2O$, $N_2$, CO, and $CO_2$ and incidental impurities;
- subjecting the steel sheet to a hot-dip galvanizing treatment by coating the steel sheet in a continuous hot-dip galvanizing line to form a galvanized steel sheet; and
- subjecting the galvanized steel sheet to an alloying treatment by annealing the galvanized steel sheet to form a galvannealed steel sheet,
- wherein the heating step A, the heating step B, and the heating step C are successively performed, and then hot-dip galvanizing treatment is performed.

8. The method for producing the Mn-containing galvannealed steel sheet according to claim 7, wherein in the heating step B, a substep of heating the steel sheet with a combustion gas having an air ratio of 1.00 to 1.20 and a substep of heating the steel sheet with a combustion gas having an air ratio of 0.80 to 1.00 are successively performed to heat the steel sheet at a temperature of 550° C. to 700° C.

9. The method for producing the Mn-containing galvannealed steel sheet according to claim 7, wherein in the heating step C, the atmosphere has a dew point of −60° C. to 20° C.

10. The method for producing the Mn-containing galvannealed steel sheet according to claim 4, wherein in the heating step C, the atmosphere has a dew point of −60° C. to 20° C.

11. The method for producing the Mn-containing galvannealed steel sheet according to claim 8, wherein in the heating step C, the atmosphere has a dew point of −60° C. to 20° C.

12. The method for producing the Mn-containing galvannealed steel sheet according to claim 7, wherein the alloying treatment heats the galvanized steel sheet at higher than 460° C. to lower than 570° C.

13. The method for producing the Mn-containing galvannealed steel sheet according to claim 4, wherein the alloying treatment heats the galvanized steel sheet at higher than 460° C. to lower than 570° C.

14. The method for producing the Mn-containing galvannealed steel sheet according to claim 8, wherein the alloying treatment heats the galvanized steel sheet at higher than 460° C. to lower than 570° C.

15. The method for producing the Mn-containing galvannealed steel sheet according to claim 5, wherein the alloying treatment heats the galvanized steel sheet at higher than 460° C. to lower than 570° C.

16. The method for producing the Mn-containing galvannealed steel sheet according to claim 9, wherein the alloying treatment heats the galvanized steel sheet at higher than 460° C. to lower than 570° C.

17. The method for producing the Mn-containing galvannealed steel sheet according to claim 10, wherein the alloying treatment heats the galvanized steel sheet at higher than 460° C. to lower than 570° C.

18. The method for producing the Mn-containing galvannealed steel sheet according to claim 11, wherein the alloying treatment heats the galvanized steel sheet at higher than 460° C. to lower than 570° C.

* * * * *

UNITED STATES PATENT AND TRADEMARK OFFICE
CERTIFICATE OF CORRECTION

PATENT NO. : 11,136,641 B2
APPLICATION NO. : 16/064526
DATED : October 5, 2021
INVENTOR(S) : Satoshi Maeda et al.

Page 1 of 1

It is certified that error appears in the above-identified patent and that said Letters Patent is hereby corrected as shown below:

In the Claims

In Claim 1, Column 19, Line 54: "in terms of an amount of 0" should read -- in terms of an amount of O --

In Claim 1, Column 19, Line 63: "in terms of an amount of 0" should read -- in terms of an amount of O --

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*